(12) United States Patent
Akopian

(10) Patent No.: US 7,120,191 B2
(45) Date of Patent: Oct. 10, 2006

(54) METHOD AND APPARATUS FOR ACQUIRING A RANGING SIGNAL OF A POSITIONING SYSTEM

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 729 days.

(21) Appl. No.: 10/016,499

(22) Filed: Dec. 12, 2001

(65) Prior Publication Data
US 2003/0108126 A1 Jun. 12, 2003

(51) Int. Cl.
H04B 1/69 (2006.01)
H04B 1/707 (2006.01)
H04B 1/713 (2006.01)

(52) U.S. Cl. .................. 375/147; 375/150; 375/152

(58) Field of Classification Search ............. 375/140, 375/147, 149, 150, 130, 316, 148, 152; 316/324, 316/334, 354, 362
See application file for complete search history.

(56) References Cited

U.S. PATENT DOCUMENTS

| 4,841,544 A * | 6/1989 | Nuytkens | 375/150 |
| 6,111,911 A * | 8/2000 | Sanderford et al. | 375/147 |
| 6,289,041 B1 * | 9/2001 | Krasner | 375/152 |
| 6,577,271 B1 * | 6/2003 | Gronemeyer | 342/378 |
| 6,577,674 B1 * | 6/2003 | Ko et al. | 375/148 |
| 2001/0005402 A1 * | 6/2001 | Nagatani et al. | 375/296 |
| 2002/0058927 A1 * | 5/2002 | Becker et al. | 604/518 |
| 2002/0064210 A1 * | 5/2002 | Sullivan | 375/145 |
| 2002/0123352 A1 * | 9/2002 | Vayanos et al. | 455/456 |

FOREIGN PATENT DOCUMENTS

WO    WO 99/26370    5/1999

* cited by examiner

*Primary Examiner*—Chieh M. Fan
*Assistant Examiner*—Jason M. Perilla
(74) *Attorney, Agent, or Firm*—Ware, Fressola, Van Der Sluys & Adolphson LLP

(57) ABSTRACT

A method and corresponding apparatus for accurately determining the offset of the carrier frequency of a received signal from a nominal frequency (the offset due to for example Doppler shifting), such as is done in a ranging receiver when acquiring or tracking a signal transmitted by a beacon (such as a satellite) of a positioning system. The method amplifies a conventional correlation by performing a special noncoherent integration of the real and imaginary components of the output of a conventional (coherent) correlation calculation, resulting in a complex phasor having a phase that bears information about the offset of the carrier frequency from the nominal carrier frequency.

10 Claims, 3 Drawing Sheets

METHOD AND APPARATUS FOR ACQUIRING A RANGING SIGNAL OF A POSITIONING SYSTEM

FIELD OF THE INVENTION

The present invention relates to CDMA (Code Division Multiple Access) spread spectrum receivers, and more particularly to fast acquisition GPS (Global Positioning System) receivers (or, more generally, ranging receivers).

BACKGROUND OF THE INVENTION

Spread spectrum communication in its basic form is a method of taking a data signal that is used to modulate a sinusoidal carrier and then spreading its bandwidth to a much larger value, e.g. in a global positioning system (GPS) application, the spreading is achieved by multiplying a single-frequency carrier by a high-rate binary (−1,1) pseudo-random noise (PRN) code sequence known to GPS users. Thus, the signal that is transmitted includes a data component, a PRN component, and a (sinusoidal) carrier component.

At the receiver of such a signal, a synchronized replica of the transmitted PRN code is required to de-spread the data sequence. Initial synchronization, called acquisition, is followed by fine synchronization, which is called tracking.

The present invention relates primarily to acquisition, not tracking. Acquisition is the process by which the replica PRN code is synchronized (to within a small timing offset) with the code conveyed by the received signal either for the first time or after losing a previously acquired signal, and also by which the carrier frequency of the received signal is determined. Thus, to acquire a signal, an acquisition system must accurately determine any frequency-shifting of the received signal from the transmitted frequency in order to accurately wipe off (remove) the carrier signal. Frequency-shifting can be caused by relative motion of the transmitter and receiver (Doppler-shifting) as well as by clock inaccuracies (so that a transmitter and receiver sometimes do not agree on what is in fact the same frequency). The carrier frequency-shifting results in a modulation of a code component after carrier wipe-off in the receiver. Thus, in acquiring a signal, it is also necessary that the replica code sequence be not only time-aligned with the received code sequence, but also modulated to compensate for the frequency-shifting so as to fully eliminate the PRN sequence and leave behind only the data conveyed by the received signal. The acquisition process is therefore a two-dimensional search, a search both in code phase and in frequency.

For some GPS signals (the civil GPS or C/A (course acquisition) code signals), the search interval in the frequency domain can be as large as +/−6 kHz. In addition, the phase of the received code relative to the replica can be any possible value of code phase, due to uncertainties in position of the satellite and time of transmission of the received signal. A PRN code period is typically 1023 chips, the term chips being used to designate bits of code conveyed by the transmitted signal, as opposed to bits of data. Thus, the acquisition module of a receiver must search a 12 kHz-wide interval with 1023×$k_s$ different code phases, where $k_s$ denotes the number of samples per chip.

Ordinary GPS receivers, i.e. those designed only for operation with unobstructed satellites, search for the frequency shift with a granularity of around 1 kHz. Thus, such receivers must search 12×1023×$k_s$ different code/frequency combinations.

A GPS receiver designed for indoor operation must have an operating mode with equivalent noise bandwidth on the order of 10 Hz in the acquisition stage. Even with an equivalent noise bandwidth as small as 10 Hz though, for reliable tracking some post-detection filtering must still be performed as well as some further refining of the value determined for the carrier frequency in the acquisition stage. The granularity of 10 Hz requires that the receiver search 1200×$k_s$×1023 different code/frequency combinations and makes the sequential search so time-consuming as to be unrealistic, motivating the use of parallel and fast search methods.

Because of the granularity used for the carrier frequency in the acquisition stage, the tracking stage often includes a preliminary fine frequency process for refining the carrier frequency determination, before initiating tracking. An alternative is to provide a more precise signal acquisition, but to do so is problematic, because signal acquisition is based on performing a correlation of the received signal with a replica, a correlation that includes an estimate of the offset of the carrier frequency from a nominal carrier frequency (due to the Doppler shifting and clock inaccuracies mentioned above), and since the received signal is modulated not only by the PRN code (for example at 1.023 MHz for a coarse acquisition signal) but also by the navigation message at a bit rate of 50 Hz, the correlation becomes corrupted if a signal fragment is used that is longer than 20 ms (the duration of a navigation data bit). Thus there is an apparent limit of 50 Hz for the precision with which the carrier frequency can be acquired. It is possible to overcome the apparent limit by performing multiple correlations, but then signal acquisition takes longer.

What is needed is a method of fast acquisition by a GPS receiver (or, more generally, any ranging receiver, i.e. not necessarily a ranging receiver used with the Global Positioning System but including for example ranging receivers used with GLONASS, the Russian version of a global positioning system) that includes a more precise estimate of the carrier frequency than is typically provided (i.e. to within a few Hz, as opposed to 50 Hz), and so abbreviate or eliminate the need for any preliminary fine frequency process in the tracking loop of the receiver.

SUMMARY OF THE INVENTION

Accordingly, in a first aspect of the invention, a method is provided for determining information about the carrier frequency of a signal transmitted by a possibly moving transmitter, the signal having a code component and a carrier component, the method including: a step of responding to successive approximately carrier-demodulated received signal fragments, and providing a set of correlation results indicating information about the correlation of the approximately carrier-demodulated received signal fragments with a replica of the code component and any remaining carrier component, wherein the set is formed using different possible offsets from a nominal carrier frequency used to approximately carrier-demodulate the received signal fragment, and further wherein each element of the set is provided as a phasor having a magnitude and a phase; and a step of responding to the set of phasors, selecting the phasor having a magnitude distinguishing it from all the other elements of the set, and determining the phase of the selected phasor.

Further in accord with the first aspect of the invention, the set of correlation results may be a matrix of correlation results, and the matrix of correlation results may be spanned by an index indicating an offset from a nominal carrier frequency and also by an index indicating code phase, and the selected phasor may be the phasor having the maximum magnitude of all the elements of the set. Further, the step of providing the matrix of correlation results may include a step of performing a coherent integration of each of a series of signal fragments, and a step of performing a non-coherent integration in which the phasor results of the coherent integrations are combined without regard to phase. Further still, the step of performing the non-coherent integration may involve multiplying each element of a matrix of correlation results provided using a coherent integration of a first signal fragment, by the complex conjugate of a corresponding element for an immediately preceding signal fragment. Also further, in providing the matrix of correlation results as phasor values and in determining the phase of the phasor having the maximum magnitude of all the elements of the matrix, in some applications only at most two phasor values may be held in a memory device at any instant of time, and of the two phasor values, only the phasor value having the larger magnitude may be saved in the memory device before calculating a next phasor value.

In a second aspect of the invention, an apparatus is provided for determining information about the carrier frequency of a signal transmitted by a possibly moving transmitter, the signal having a code component and a carrier component, the apparatus including: means, responsive to approximately carrier-demodulated received signal fragments, for providing a set of correlation results indicating information about the correlation of the approximately carrier-demodulated received signal fragments with a replica of the code component and any remaining carrier component, wherein the set is formed using different possible offsets from a nominal carrier frequency used to approximately carrier-demodulate the received signal fragment, and further wherein each element of the set is provided as a phasor having a phase and a magnitude; and means, responsive to the set of phasors, for selecting the phasor having a magnitude distinguishing it from all the other elements of the set, and determining the phase of the selected phasor, and for providing information about the carrier frequency based on the phase of the selected phasor.

Further in accord with the second aspect of the invention, the set of correlation results (phasors) may be a matrix of correlation results, and further wherein the matrix of correlation results may be spanned by an index indicating an offset from a nominal carrier frequency and also by an index indicating code phase, and wherein the selected phasor may be the phasor having the maximum magnitude of all the elements of the set. Further, the means for providing the matrix of correlation results may include means, responsive to a series of signal fragments, for performing a coherent integration of each of the series of signal fragments, and also means, responsive to the coherent integrations, for providing a non-coherent integration in which the phasor results of the coherent integrations are combined without regard to phase. Still further, the means for performing the non-coherent integration may multiply each element of a matrix of correlation results provided using a coherent integration of a first signal fragment, by the complex conjugate of a corresponding element for an immediately preceding signal fragment. Also further, in some applications, in providing the matrix of correlation results as phasor values and in determining the phase of the phasor having the maximum magnitude of all the elements of the matrix, only at most two phasor values may be held in a memory device at any instant of time, and of the two phasor values, only the phasor value having the larger magnitude may be saved in the memory device before calculating a next phasor value.

In a third aspect of the invention, a system is provided including: a transmitter for transmitting a signal having a code component and a carrier component, and a ranging receiver for receiving the signal and for determining information about the carrier frequency of the signal, the ranging receiver characterized in that it includes: means, responsive to approximately carrier-demodulated received signal fragment, for providing a set of correlation results indicating information about the correlation of the approximately carrier-demodulated received signal fragments with a replica of the code component and any remaining carrier component, wherein the set is formed using different possible offsets from a nominal carrier frequency used to approximately carrier-demodulate the received signal fragment, and further wherein each element of the set is provided as a phasor having a phase and a magnitude; and means, responsive to the matrix of phasors, for selecting the phasor having a magnitude distinguishing it from all the other elements of the set, and determining the phase of the selected phasor, and for providing information about the carrier frequency based on the phase of the selected phasor.

Further in accord with the third aspect of the invention, the system provided by the invention may also include a computing resource external to the ranging receiver, and the apparatus may communicate information to the computing facility via a wireless communication system and the computing facility may provide at least some of the computation needed either to provide the set of correlation results or to select the phasor.

The invention provides fine frequency estimates of the carrier frequency used to convey ranging signals immediately after initial acquisition; such estimates can be used for tracking or as the initialization of more sensitive dine acquisition algorithm, and so simplifying the search for the carrier frequency. The invention thus allows removing a fine acquisition stage from a ranging receiver, saving in some embodiments for example as much as one or two seconds for acquisition in typical ranging receivers, or simplifying the operation of such a stage, reducing the computational burden in some embodiments for example by as much as a factor of up to fifty.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
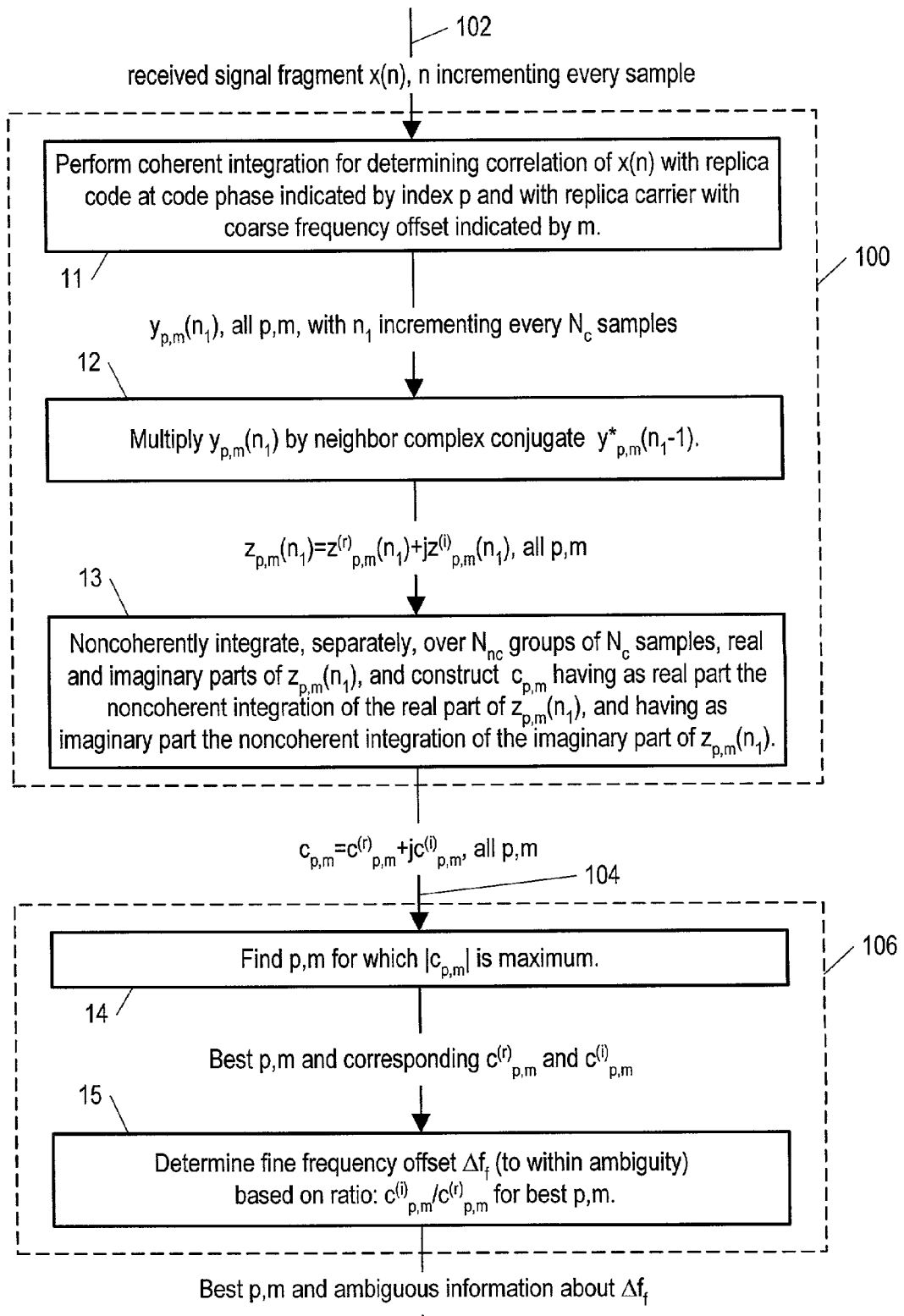
FIG. 1 is a flowchart of the invention.

The invention is described below as a subprocess of the acquisition stage of a ranging receiver such as a GPS receiver and when specific numerical examples are given, civil GPS signals (C/A code signals) are used, but it should be understood that the invention can be used in any receiver of a spread spectrum signal, not necessarily receivers used to provide navigation solutions, and the invention is of course not restricted to use with civil GPS (C/A code)

signals. The invention provides a relatively precise estimate of the offset of the carrier frequency from a nominal carrier frequency, the offset attributable to one or another of various causes including Doppler shifting or clock inaccuracies (the clock of either the ranging receiver or the clock of the source of the spread spectrum signal, i.e. a satellite in case of a GPS receiver). The invention achieves its object by performing, as part of the processing of the acquisition stage, a modified correlation (modified as compared to the correlation performed in prior art ranging receivers) of a received signal fragment with a replica of the PRN code known to be used by the source of the signal.

As explained above, the acquisition process determines the code phase (the relative phase of the replica and the received signal fragment) and also the frequency of any complex sinusoidal modulation remaining after carrier wipeoff assuming a nominal carrier frequency, i.e. it also determines a remaining frequency offset from the nominal carrier frequency.

The code phase is determined according to the peak of a correlation function. As explained above, the length of the received signal fragment used in performing the correlation is, according to the prior art, restricted typically to 20 ms because modulation of the received signal fragment by the 50 Hz navigation data corrupts an ordinary correlation using a longer signal fragment.

A process according to the present invention for arriving at a more precise estimate of the remaining frequency offset $\Delta f$ (from a nominal carrier frequency $f_0$) begins with a signal fragment after both code wipeoff and nominal carrier frequency demodulation by each coarse frequency. The description that follows will use equations (1)–(6) that are valid only after demodulation by the correct code phase and also by the correct coarse frequency, i.e. the code phase and coarse frequency offset for which a process of coherent and non-coherent integrations in performing a correlation of the signal fragment with a code replica and a carrier replica (i.e. a sinusoid at a frequency equal to the coarse frequency offset), as described below, gives the largest correlation result. For other code phase and coarse frequency pairs, more general equations apply, equations that reduce to equations (1)–(6) for the correct code phase and coarse frequency pair.

For purposes of the present invention, the signal fragment can be modeled as, $$x(n) = a_n e^{2\pi j \Delta f n \Delta t} + x_{noise}(n) = a_n e^{2\pi j (\Delta f_c + \Delta f_f) n \Delta t} + x_{noise}(n) \quad (1)$$

where the remaining frequency offset $\Delta f$ is presented as a combination of a coarse frequency offset $\Delta f_c$ with some granularity $\Delta f_{c,step}$ (e.g. 100 Hz) and a fine frequency offset $\Delta f_f$, which is preferably in the range $(-\Delta f_{c,step}/2, +\Delta f_{c,step}/2)$. The code wipe-off in the context of the present invention is to be understood as the multiplication of the signal fragment by the replica code without integration. If the code phase is correct then the code is wiped off and only modulations due to navigation data bits and residual Doppler remain. If the coarse frequency offset guess during the acquisition process is correct, then the correlation peak will be found and the fine frequency offset $\Delta f_f$ can be estimated.

In the following description of the invention, the noise component $x_{noise}(n)$ is omitted for clarity. Moreover, the amplitude $a_n$ in eq. (1) should be understood to be the amplitude of the signal fragment $x(n)$, i.e. the amplitude of the signal after code wipeoff using the correct code phase, and after frequency demodulation using a suitably good estimate of the coarse frequency offset $\Delta f_c$ (a good estimate in that it is substantially the best guess possible using a step size of 50 Hz). If the estimate of the coarse frequency offset yields a frequency that is far from the true carrier frequency (including the Doppler, etc.) or if the code phase is not correct, then the signal value $x(n)$ is small, i.e. it is suppressed. The description that follows does not address such cases. The problem addressed by the invention is to find a fine frequency offset after the acquisition search determines the correct code phase (i.e. code wipeoff is assumed) and some coarse frequency estimate (so that the signal arriving at a logic module implementing the invention is assumed demodulated by the estimated coarse frequency). Of course in actual practice, the inputs to a logic module that implements the invention will be a number of different correlations, each based on a coherent integration of the received signal fragment with a particular code phase and a particular coarse frequency offset.

The integration (summation) of an ordinary correlation calculation subsamples and thereby enhances the signal component, each subsample corresponding to a different increment of $\Delta f_f$, i.e. $\Delta f_f, 2\Delta f_f, 3\Delta f_f, \ldots, N_c \Delta f_f$, where $N_c$ is the number of increments of $\Delta f_f$ included in the ordinary correlation. After demodulation by the factor $e^{-2\pi j f_c n \Delta t}$ to account for the coarse frequency offset, each subsample indicated by the index $n = n_1 N_c + n_2$, can be expressed as, $$y(n_1) = \sum_{n_2=0}^{N_c-1} a_{n_1 N_c + n_2} e^{2\pi j (\Delta f_c + \Delta f_f)(n_1 N_c + n_2)\Delta t} e^{-2\pi j \Delta f_c (n_1 N_c + n_2)\Delta t} \approx \quad (2)$$

$$\tilde{a}_{n_1} e^{2\pi j \Delta f_f n_1 N_c \Delta t},$$

where $N_c$ is the number of samples in the coherent integration (indicated by eq. (2)) and is usually some integral multiple of the PRN code epoch. The result, $y(n_1)$, is the (integrated) signal at a discrete time indicated by $n_1$; $y(n_1)$ is, more specifically, a fragment of the received, code-wiped signal, $N_c$ samples long, correlated with the sinusoid $e^{-2\pi j \Delta f_c (n_1 N_c + n_2)\Delta t}$. (The index n is used to indicate an instant of time before the coherent integration, with n incrementing with each new sample. For example, if there are two samples per chip then the sampling rate is $2*1,023,000$ samples per second, and so n increments $2*1,023,000$ for each second.) After the coherent integration, which is an integration over an integral multiple of the code epoch length (i.e. an interval of length $k*1023$ chips for some integer k), a second time index $n_1$ is used, one that increments every coherent integration length. For example, if the coherent integration length is just one code epoch (i.e. 1023 chips), then the integrated sampling rate will be 1000 samples per second; i.e. with the coherent integration, every 1023 samples are accumulated into a single, integrated sample.

Bear in mind that, as mentioned above, in actual practice the quantity $y(n_1)$ is calculated for a particular code phase and a particular coarse frequency offset. If the code phase is indicated by an index p and the coarse frequency is indicated by an index m, then $y(n_1)$ is more properly written as $y_{p,m}(n_1)$, but for simplicity of notation, the p,m dependence is suppressed in what follows.

Multiplying each sample after the coherent processing, given by eq. (2), by the complex conjugate of the nearest neighbor sample occurring earlier in time, provides, $$z(n_1) \equiv y(n_1) y^*(n_1-1) = \tilde{a}_{n_1} \tilde{a}_{n_1+1} e^{2\pi j \Delta f_f n_1 N_c \Delta t} e^{-2\pi j \Delta f_f (n_1-1) N_c \Delta t} = \tilde{a}_{n_1} \tilde{a}_{n_1+1} e^{2\pi j \Delta f_f N_c \Delta t} \quad (3)$$

which compensates for the time (code epoch) dependence $n_1$. Defining $\tilde{\tilde{a}}_{n_1} \equiv \tilde{a}_{n_1} \tilde{a}_{n_1+1}$, and using the well-known Euler's theorem, the quantity $z(n_1)$ can be written as, $$z(n_1) = \tilde{\tilde{a}}_{n_1} e^{2\pi j \Delta f_f N_c \Delta t} = \tilde{\tilde{a}}_{n_1}[\cos(2\pi \Delta f_f N_c \Delta t) + j \sin(2\pi \Delta f_f N_c \Delta t)]. \quad (4)$$

The amplitude $\tilde{\tilde{a}}_{n_1}$ of the sinusoidal quantity $z(n_1)$ in general can vary with time (since it depends on $n_1$, which indicates an instant of time), due to the BPSK data modulation, while the other terms of the quantity $z(n_1)$ (the terms in square brackets in eq. (4) yielding the phase of the phasor quantity $z(n_1)$) do not depend on time. And here is the key to understanding the invention: one can find the phase of the phasor quantity $z(n_1)$ easily enough because that phase does not change with time, and since that phase has information about the sought-after fine frequency offset $\Delta f_f$, we can use the phase to find the fine frequency offset $\Delta f_f$.

Now, according to the invention, a more precise estimate of the frequency offset than results from an ordinary correlation is provided by what is here called a (supplemental) non-coherent processing stage that integrates (sums) the absolute values of real part of the signal $z(n_1)$ for different times each indicated by a different value of $n_1$, and, separately, the imaginary parts, as follows:

$$c^{(r)} \equiv \sum_{n_{nc}=0}^{N_{nc}-1} |\text{Re}(z(n_{nc}))| = \quad (5)$$

$$\sum_{n_{nc}=0}^{N_{nc}-1} |\tilde{\tilde{a}}_{n_{nc}} \cos(2\pi \Delta f N_c \Delta t)| = |\cos(2\pi \Delta f N_c \Delta t)| \sum_{n_{nc}=0}^{N_{nc}-1} |\tilde{\tilde{a}}_{n_{nc}}|,$$

and $$c^{(i)} \equiv \sum_{n_{nc}=0}^{N_{nc}-1} |\text{Im}(z(n_{nc}))| = \quad (6)$$

$$\sum_{n_{nc}=0}^{N_{nc}-1} |\tilde{\tilde{a}}_{n_{nc}} \sin(2\pi \Delta f N_c \Delta t)| = |\sin(2\pi \Delta f N_c \Delta t)| \sum_{n_{nc}=0}^{N_{nc}-1} |\tilde{\tilde{a}}_{n_{nc}}|,$$

where $N_{nc}$ is the number of integrated samples in the noncoherent integration, i.e. the noncoherent integration length. The value used for $N_{nc}$ depends on the signal strength; it is smaller for a higher signal strength, and could even be as small as one.

As explained above, the amplitude $a_n$ and so the amplitude $\tilde{a}_{n_1}$ and likewise the amplitude $\tilde{\tilde{a}}_{n_1}$ are amplitudes for a particular code phase p and a particular frequency offset m, both p and m being integers and serving as indices, but the indices p and m are suppressed in eqs. (1)–(6) above for clarity of notation. Thus, the amplitude $\tilde{\tilde{a}}_{n_1}$ is really shorthand for $\tilde{\tilde{a}}_{n_1,p,m}$ where the index $n_1$ refers to a particular code epoch (and so to a particular instant of time). Thus also $z(n_1)$ is shorthand for $z_{p,m}(n_1)$, and so $c^{(r)}$ is shorthand for $c_{p,m}^{(r)}$ and similarly for $c^{(i)}$.

Now according further to the invention, after performing the two non-coherent integrations given by eqs. (5) and (6), and constructing the matrix $c_{p,m}$ according to, $$c_{p,m} = c_{p,m}^{(r)} + jc_{p,m}^{(i)} \quad (7)$$

(now again making express the p,m dependence of $c_{p,m}^{(r)}$ and $c_{p,m}^{(i)}$ of eqs. (5) and (6)), the set of all $$|c_{p,m}| = |c_{p,m}^{(r)} + jc_{p,m}^{(i)}| = \sqrt{(c_{p,m}^{(r)})^2 + (c_{p,m}^{(i)})^2} \quad (8)$$

is searched to find which is the maximum, indicated here as $$\max_{p,m}\{|c_{p,m}|\}.$$

The indices p and m for which $|c_{p,m}|$ attains its maximum indicate the code phase and coarse frequency offset. According to the invention, the real component $c_{p,m}^{(r)}$ with p,m for which $|c_{p,m}|$ attains its maximum, and the corresponding imaginary component $c_{p,m}^{(i)}$ are then used to determine the fine frequency offset $\Delta f_f$ on the basis that these two quantities indicate the phase of a phasor $c_{p,m} = c_{p,m}^{(r)} + jc_{p,m}^{(i)}$ (for the best p,m, i.e. for the p,m for which $|c_{p,m}|$ attains its maximum), a phase that depends on the fine frequency offset $\Delta f_f$.

Thus, at each pair of values of frequency and code phase that would be searched in a conventional acquisition, the invention provides not one correlation output (including coherent and noncoherent part), but two outputs, $c_{p,m}^{(r)}$ and $c_{p,m}^{(i)}$. The strength of the response is calculated using the sum of the squared values of the two outputs, and the peak in the strength so calculated corresponds to the correct frequency and code phase pair. But in addition, the two outputs $c_{p,m}^{(r)}$ and $c_{p,m}^{(i)}$ give information useful in determining a fine frequency offset, i.e. a frequency offset fine enough to estimate the carrier frequency to within better than 50 Hz. (After the coherent integration, we do have complex correlation values and in principle it is possible to obtain a fine frequency offset directly from the output of the coherent integration, but in practice, in weak signal conditions, it is necessary to essentially amplify the correlation result using the non-coherent integration process of the invention. As mentioned above, a longer-interval coherent integration will not work well because of the modulation of the received signal by the navigation data.)

In summary, in a conventional noncoherent integration process, inputs x(n) (correlations of signal fragments after code wipeoff and coarse acquisition) are complex numbers $a_n + jb_n$ (more properly $a_{n,p,m} + jb_{n,p,m}$, but the indices p and m, indicating code phase and frequency offset respectively, are dropped here for simplicity of notation), and noncoherent integration is performed (in a calculation to amplify the correlation of the signal fragment with a signal of each of several different code phases and each of several different frequency offsets) as an integration of absolute values $|a_n + jb_n|$ or squared values $|a_n + jb_n|^2$. In the present invention, in contrast, noncoherent integration is performed by: first, multiplying each input by the complex conjugate of its neighbor, i.e. forming the product $(a_n + jb_n) \cdot (a_{n-1} - jb_{n-1})$; and second, noncoherently integrating, separately, the imaginary part $(b_n a_{n-1} - a_n b_{n-1})$ and the real part $(a_n a_{n-1} + b_n b_{n-1})$. The result is two values $(c^{(r)}, c^{(i)})$ (actually $(c_{p,m}^{(r)}, c_{p,m}^{(i)})$, but the dependence on the code phase index p and frequency offset index m are dropped for simplicity of notation) for the correlation at each frequency and code phase pair of the search. The largest of the sum of the squares of $c^{(r)}$ and $c^{(i)}$ (or the square root thereof) is used to determine the fine frequency offset, based on the phase of the phasor $c^{(r)} + jc^{(i)}$. The fine frequency offset so determined, when combined with the coarse frequency offset (determined as in the prior art to a precision of for example +/−50 Hz) and with the nominal frequency, yields a precise value (for example, to within 1–2 Hz) for the carrier frequency (including Doppler and other deviations from the nominal carrier frequency).

Eqs. (5) and (6) allow only an ambiguous determination of the fine frequency offset $\Delta f_f$; for a properly designed acquisition system (i.e. having a proper choice of frequency spacing), four solutions are possible:

$$\Delta f_{f,1} = \frac{\arctg(c^{(i)}/c^{(r)})}{2\pi N_c \Delta t}, \quad (9)$$

$$\Delta f_{f,2} = -\frac{\arctg(c^{(i)}/c^{(r)})}{2\pi N_c \Delta t}, \quad (10)$$

$$\Delta f_{f,3} = \pi - \frac{\arctg(c^{(i)}/c^{(r)})}{2\pi N_c \Delta t}, \text{ and} \quad (11)$$

$$\Delta f_{f,4} = -\pi + \frac{\arctg(c^{(i)}/c^{(r)})}{2\pi N_c \Delta t}. \quad (12)$$

where $c^{(r)}$ is shorthand for $c_{p,m}^{(r)}$ for the p,m for which $|c_{p,m}=c_{p,m}^{(r)}+jc_{p,m}^{(i)}|$ (or, equivalently, $|c_{p,m}|^2$) is maximum, and similarly for $c^{(i)}$.

The estimate of the fine frequency offset is ambiguous (having the four possible results given by eqs. (9)–(12)) because of taking absolute values of imaginary and real components. Nonetheless, the uncertainty in the fine frequency offset is greatly reduced using the invention. The ambiguity can be resolved by one or another method executed by the acquisition stage prior to handoff to the tracking algorithm, or the tracking algorithm can be initiated with all four possible solutions as input.

Referring now to FIG. 1, a flowchart of the invention is shown as beginning with a first step 11 in which a received signal fragment x(n), at a time indicated by the variable n, is correlated with a replica code at a number of different code phases indicated by index p and also correlated with (in effect) a number of different replica carrier sinusoids, each including a different coarse frequency offset indicated by index m, producing an output $y_{p,m}(n_1)$ for each different code phase and coarse frequency offset, the index $n_1$ incrementing over every $N_c$ samples, whereas the original index n increments with each sample. Next, in a step 12, each $y_{p,m}(n_1)$ is multiplied by the complex conjugate of its neighbor, i.e. by $y_{p,m}^*(n_1-1)$, producing $z_{p,m}(n_1)$ having real and imaginary components, for all different p,m. Next, in a step 13, the real and imaginary components of the quantities $z_{p,m}(n_1)$ for all p,m are each (separately) noncoherently integrated over $N_{nc}$ values of $n_1$ (each value of $n_1$ corresponding to $N_c$ samples), as indicated by eqs. (5) and (6). The result is a quantity $c_{p,m}$ having real and imaginary components $c_{p,m}^{(r)}$ and $c_{p,m}^{(i)}$ respectively. Next, in a step 14, the $c_{p,m}$ are searched over all p,m to find the p,m for which $|c_{p,m}|$ (or, equivalently, $|c_{p,m}|^2$) is a maximum, yielding a "best" p,m and corresponding $c_{p,m}^{(r)}$ and $c_{p,m}^{(i)}$. Finally, in a step 15, (ambiguous) information about the fine frequency offset $\Delta f_f$ is determined based on the ratio $c_{p,m}^{(i)}/c_{p,m}^{(r)}$, as set out in eqs. (9)–(12). As explained above, the ambiguity in the fine frequency offset can be resolved by further processing within the acquisition module, or the ambiguous information can be provided to the tracking module and the ambiguity can be resolved there.

Still referring to FIG. 1, in essence the method includes a first step 100, including substeps 11, 12, and 13, which provides a matrix 104 of correlation results indicating information about the correlations of the approximately carrier-demodulated successively received signal fragments 102 with a replica of the code component and a replica of any remaining carrier component (i.e. a sinusoid having a frequency equal to a coarse offset from the nominal carrier frequency), wherein the matrix is spanned by the index p indicating code phase and the index m indicating an offset from a nominal carrier frequency used to approximately carrier-demodulate the received signal fragments, and further wherein each element of the matrix 104 is provided as a phasor ($c_{p,m}$); and a second step 104 of responding to the matrix 104 of phasors and determining the phase of the phasor having the maximum magnitude of all the elements of the matrix, and so providing a more precise value for the carrier frequency of the carrier than what is provided by the offset for the phasor having the maximum magnitude.

Figure 2:
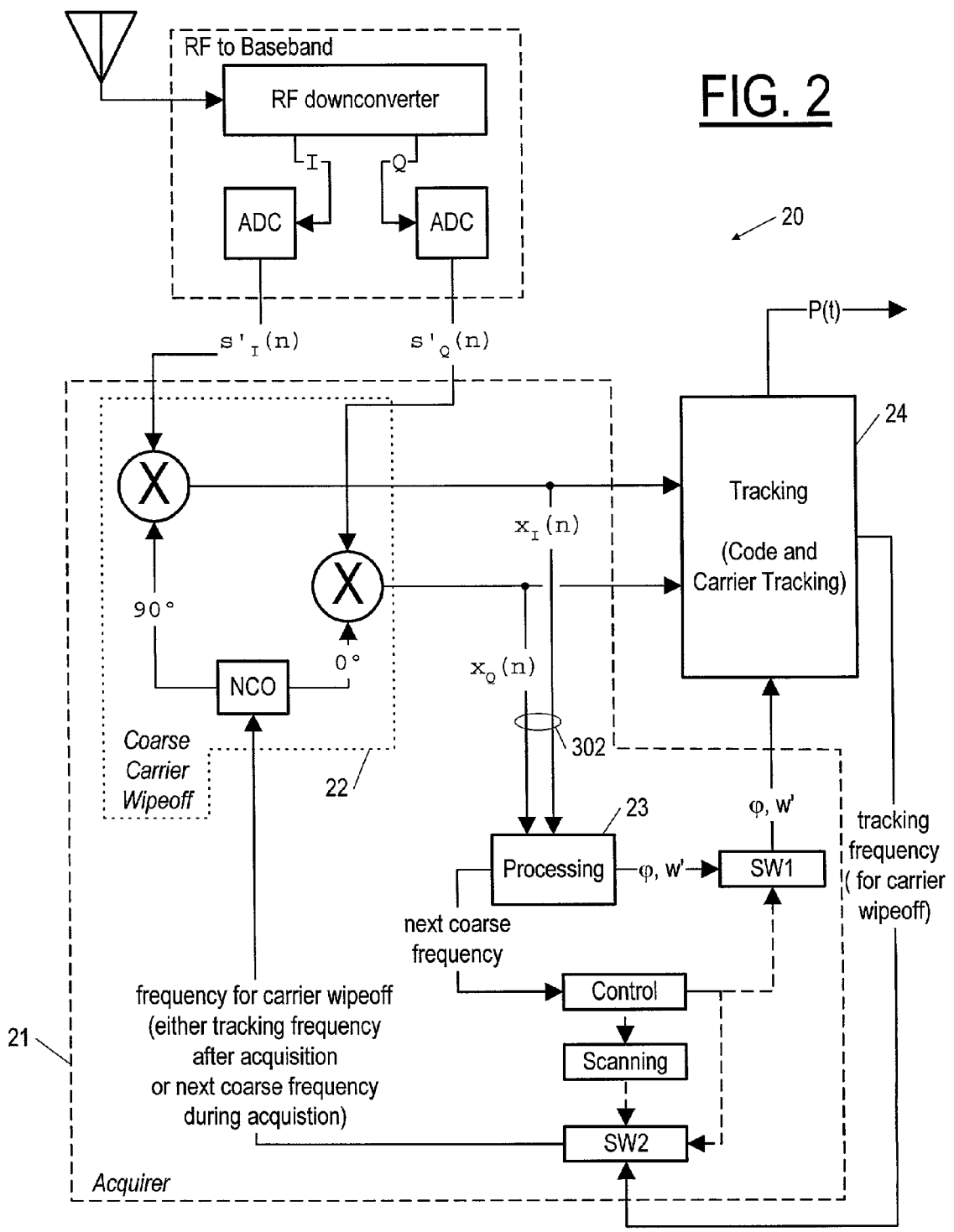
FIG. 2 is a block diagram/flow diagram of a GPS receiver in which the invention can be implemented.

Referring now to FIG. 2, an exemplary embodiment of a ranging receiver 20 in which the invention can be implemented is shown receiving a signal s(t) corresponding to a transmitted signal $s_t(t)$, given by, $$s_t(t)=AC(t)P(t)\cos(wt).$$

The receiver 20 includes an acquirer 21 (in which logic code implementing the steps of the invention as indicated in FIG. 1 is hosted) for acquiring the signal, and a tracking module 24 for making adjustments necessary to track the acquired signal, i.e. the maintain acquisition. The received signal s(t) includes a code component $C_\phi(t)$ at a phase $\phi$ relative to the phase of the code component of the transmitted signal, a carrier component $A \times \cos(w't+\phi_{car})$ the $\phi_{car}$ indicating that the carrier component of the received signal is out of phase by an amount $\phi_{car}$ with respect to the transmitted signal, and a data component P(t), again in general differing in phase from the data component of the transmitted signal although not expressly indicated. The carrier frequency w' is different than the transmitted frequency w (w' is shifted in frequency from the nominal carrier frequency w) because of the relative motion of the transmitter and receiver, i.e. because of Doppler shifting, and also because of inaccuracies in the receiver and transmitter clocks. A replica of the code component $C_\phi(t)$ is generated in the receiver (in either the acquirer 21 or the tracking module 24, depending on the stage of operation) with some phase $\phi$. In routine receiver operation, after the receiver has acquired a signal, in order to extract the data component the receiver mixes the received signal with a sinusoid at a received carrier frequency w', and also mixes the signal with a replica code $C_\phi(t)$ at a replica code phase $\phi$ that puts the replica code in phase with the transmitted code. (The phases are different because of the transmission time from the satellite to the receiver and also because the clocks in the receiver and transmitter are not synchronized.)

The received carrier frequency w' and the correct replica code phase y are determined by an acquirer 21. To acquire the signal s(t), and so to determine the received carrier frequency w' and replica code phase $\phi$, the receiver provides a portion of the received signal s(t) to a radio-frequency (RF) to baseband module that includes an RF downconverter and an analog-to-digital converter (ADC), providing an approximately baseband signal s'(n) (the index n indicating a sample made at a particular time and so indicating the particular time), which still includes the code component C(n). The RF to baseband module provides in-phase and quadrature versions of the received, downconverted signal, and provides the two versions to respective ADC modules. One ADC module then provides an in-phase digitized, downconverted received signal $s'_I(n)$, and the other provides a quadrature digitized, downconverted signal $s'_Q(n)$. The combination of two such outputs is treated as a complex entity in what follows.

Instead of an RF to baseband down-converting followed by an analog to digital conversion, it is also possible to use an RF to intermediate frequency conversion followed by a conversion to baseband combined with ADC.

Once the acquirer 21 precisely determines the carrier frequency w', including any shifting δw away from the nominal carrier frequency w, and also the replica code phase φ, the receiver 20 can extract the data signal P(t) from the received signal s(t) by for example first mixing the received signal s(t) with a sinusoid at the precisely determined carrier frequency w', then mixing the resulting signal with a synchronized (in phase) replica code signal $C_\phi(t)$, and finally performing an integrate and dump, leaving only the data signal P(t). Sometimes the data extraction is performed within the tracking module 24, as is indicated in the embodiment shown in FIG. 2. The tracking module then not only extracts the data signal P(t) but also examines it to determine whether to make slight, tracking adjustments to the carrier frequency w' or the replica code phase φ so as to keep the receiver 20 tuned to the signal s(t).

Still referring to FIG. 2, the signal s'(n), referring to both $s'_I(n)$ and $s'_Q(n)$, includes both a code component C(n) as well as a residual carrier component depending on the shift δw. As explained above, the shift δw in some applications is typically anywhere in a bandwidth of 12 kHz about the nominal carrier frequency w. The code C(n) is typically a pseudorandom sequence of bits of a predetermined length. In case of civil GPS applications, a code-length of 1023 bits is used. Since the code does not itself convey information and is instead merely a device by which the bandwidth of an information-bearing signal is spread over a much wider bandwidth in a way that allows other information-bearing signals to also be spread over and use the same bandwidth, a bit of such a code is referred to as a chip, instead of a bit. The chip rate is typically much greater than the bit rate of the information-bearing signal P(n). In GPS applications, the chip rate is typically 1023 chips per millisecond, whereas the data P(n) is nominally 50 bits per second.

Still referring to FIG. 2, the acquirer 21 is shown as including a coarse carrier wipeoff module (CCWM) 22 including a numerically controlled oscillator (NCO), a processing module 23 (hosting the code logic for practicing the invention), a control module, a scanning module, and switching modules used to switch from acquiring to tracking after a signal is satisfactorily acquired. The control module operates the switches SW1 and SW2 so that once the signal has been acquired (with respect to both carrier frequency and code phase), the acquisition module is switched out of the circuit including the NCO, and the tracking module 24 is switched into that circuit.

The approximate baseband signal s'(n) is provided to the CCWM 22, which mixes s'(n) with a complex sinusoid (i.e. an in-phase and quadrature sinusoid are mixed with the in-phase and quadrature approximate baseband signals $s'_I(n)$ and $s'_Q(n)$), at one of a number of several distinct frequencies in a set of coarse frequency offsets spanning a range of frequencies about the nominal frequency encompassing all possible frequency shifts. For example, in the case of a GPS receiver, the CCWM 22 would first mix the input s'(n) with a signal at 6 kHz below the nominal carrier frequency, to provide x(n). Later, at the command of the analysis module 23d, the CCWM 22 would mix the same signal s'(n) at a next coarse frequency, 5 kHz below the nominal carrier frequency, and so on, each time producing a different signal (complex) x(n) including a different coarse frequency component.

As will be explained below and as mentioned above, the processing module 23 includes components for performing the steps indicated in FIG. 1. The output of the processing module, which is used as the input to the tracking module 24, is preferably an unambiguously determined carrier frequency w' and a code phase φ.

Note that according to the invention, a carrier wipeoff using each of the coarse frequencies is needed by the processing module 23 before the processing module can begin the analysis used to acquire a signal. Thus, the processing module does not pass control to the tracking module 24 until after having the CCWM 22 perform an approximate carrier wipeoff with each coarse frequency spanning a range of frequencies presumed to include the actual to-be-determined carrier frequency, and then performing the analysis used to indicate a precise value for the carrier frequency according to the steps indicated in FIG. 1. In the course of performing the analysis, as explained above, the phasors $c_{p,m}$ corresponding to the different coarse frequencies are constructed and that having the largest magnitude is determined. To find the $c_{p,m}$ for which $|c_{p,m}|$ is a maximum, either each $c_{p,m}$ can be saved and the resulting array of $c_{p,m}$ searched after all $c_{p,m}$ are constructed, or instead only the $c_{p,m}$ for which $|c_{p,m}|$ is so far the maximum can be saved.

Figure 3:
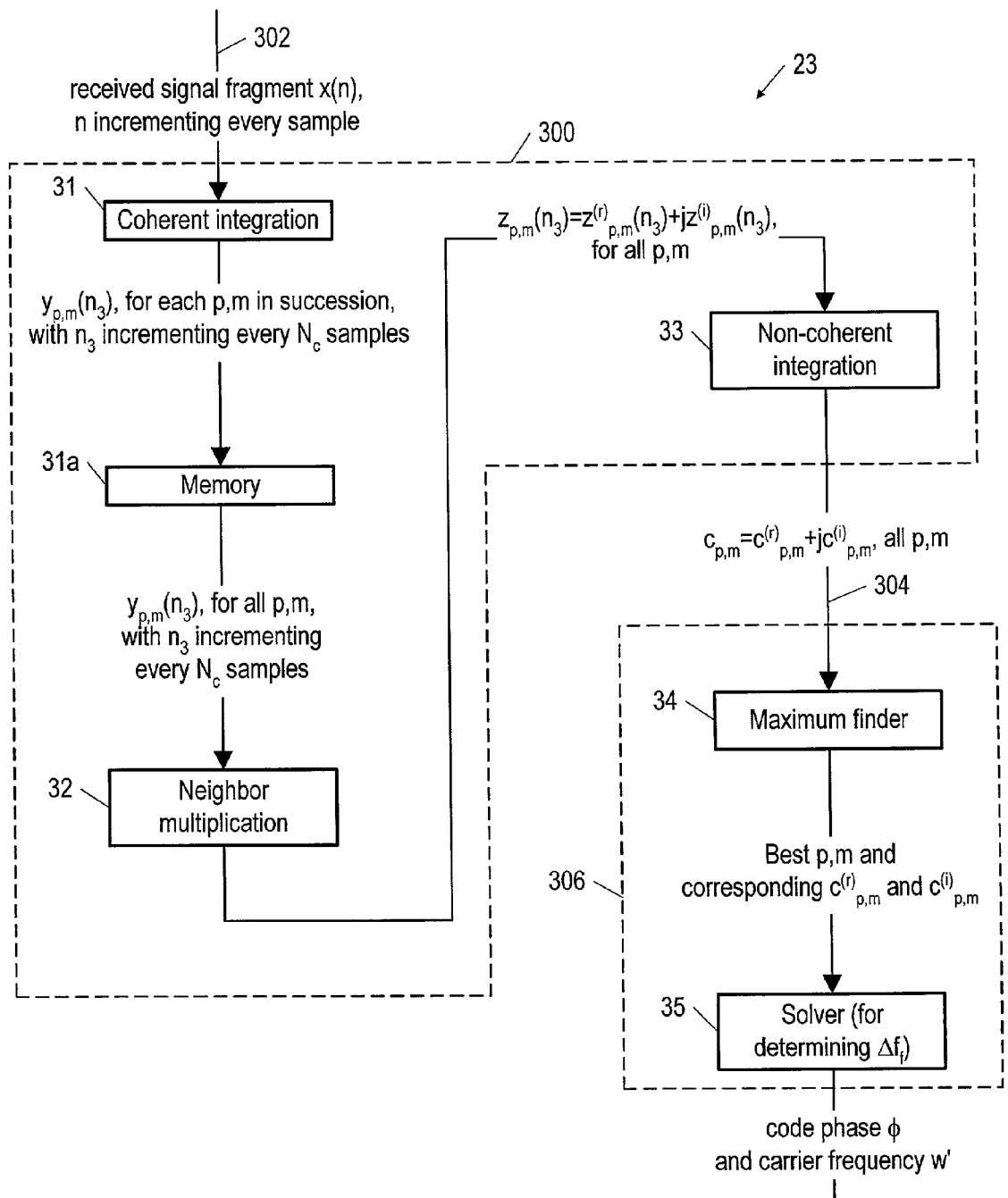
FIG. 3 is a block diagram/flow diagram of an apparatus that implements the invention.

Referring now to FIG. 3 and also to FIG. 1, the processing module 23 of FIG. 2 is shown in more detail as including modules implementing the steps indicated in FIG. 1. A module 31 (FIG. 3) performs the coherent integration of step 11 (FIG. 1), storing the results of each coherent integration for a particular code phase (indicated by an index p) and coarse frequency offset (indicated by an index m) in a memory device 31a. When all of the coherent calculations are completed (i.e. for all p and all m, the range in p and m sufficient to span all possible code phases and all possible carrier frequency shifts), a neighbor multiplication module 32 then performs the neighbor multiplication step 12. Next, a non-coherent integration module 33 performs the non-coherent integration step 13, amplifying the results of the coherent integration. A single matrix of results (each results being a complex number) is provided as an output of the non-coherent integration module 33; the matrix is spanned by the code phase index p and the coarse carrier frequency index m. A maximum finder module 34 then searches the matrix and finds the p and m for which the magnitude of the complex matrix elements is a maximum (or, equivalently, the square of the magnitude). Finally, a solver module 34 determines the phase of the phasor corresponding to the complex elements for the found p and m, extracts information about the fine frequency offset (according to step 14), and, in the preferred embodiment, performs further processing to eliminate the ambiguity of the results described in connection with eqs. (9)–(12). The output of the solver module is therefore, in the preferred embodiment, the precisely determined carrier frequency (including both the coarse and fine frequency offsets) and also the code phase, both of which are then used by the tracking phase of the receiver.

Still referring to FIG. 3, from another perspective, the invention is in essence an apparatus including: a first module 300, responsive to successive approximately carrier-demodulated received signal fragments 302, for providing a matrix 304 of correlation results indicating information about the correlation of the approximately carrier-demodulated received signal fragment with a replica of the code component and a replica of any remaining carrier component, wherein the matrix is spanned by an index p indicating code phase and an index m indicating a first offset from a nominal carrier frequency used to approximately carrier-demodulate the received signal fragment, and further wherein each element of the matrix is provided as a phasor $c_{p,m}$ having a phase and a magnitude; and a second module 306, responsive to the matrix of phasors 304, for determining the phase of the phasor having the maximum magnitude of all the elements of the matrix, and for providing information about the carrier frequency based on the phase of the phasor having the maximum magnitude of all the elements of the matrix. In the preferred embodiment, the first module 300 includes: a first sub-module 31, responsive to a series of signal fragments, for performing a coherent integration of each of the series of signal fragments, preferably by multiplying each element of a matrix of correlation results provided using a coherent integration of a first signal fragment, by the complex conjugate of a corresponding element for an immediately preceding signal fragment; and also a second sub-module 32, responsive to the coherent integrations, for providing a non-coherent integration in which the phasor results of the coherent integrations are combined without regard to phase.

It should be understood that the in performing the neighbor multiplications for forming the noncoherent sums, although the invention has been described above in which neighbor multiplications are multiplications of the first and second coherent integration result, then the second and third, then the third and fourth and so on, i.e. (1×2), (2×3), (3×4), . . . , the invention also comprehends using other neighbor multiplications, such as (1×2) (3×4) (5×6), . . . , or (1×3) (2×4) (3×5) (4×6), . . . (although the first type of neighbor multiplication (i.e. (1×2), (2×3), (3×4), . . . ) is preferred by the inventor.

It should also be understood that although the above description has been in terms of constructing a matrix $c_{p,m}$ of correlations for p,m pairs (the matrix given by eq. (7), with values for the real and imaginary components of each element given by eqs. (5) and (6) respectively after demodulation of a signal fragment using the correct code phase and coarse frequency as explained above), the invention is not limited to implementations in which all of the matrix elements are held in a memory device at any one time. In particular, it is usually preferable to perform all the integrations for a first p,m pair, then for each next such pair, perform the calculations and compare the results to those for the previous pair and keep only the largest result (of course also keeping note of the p,m pair that gave rise to the current largest result).

SCOPE OF THE INVENTION

It is to be understood that the above-described arrangements are only illustrative of the application of the principles of the present invention. In particular, it should be noted that the invention is in no way limited to use in a ranging receiver as illustrated in FIG. 2, which is provided only as an example of a ranging receiver in which the invention can be implemented; as another example, besides using a NCO to wipe off (approximately demodulate) the carrier (by removing a coarse frequency), discrete Fourier transforms (DFTs) are used. Numerous modifications and alternative arrangements may be devised by those skilled in the art without departing from the spirit and scope of the present invention, and the appended claims are intended to cover such modifications and arrangements.

What is claimed is:

1. A method for determining information about a carrier frequency of a signal transmitted by a possibly moving transmitter, the signal having a code component and a carrier component at the carrier frequency, the method comprising:
   a) responding to successive approximately carrier-demodulated received signal fragments of the signal, and providing a set of correlation results indicating information about a correlation of the successive approximately carrier-demodulated received signal fragments with phase-shifted replicas of the code component, wherein the successive approximately carrier-demodulated received signal fragments are formed using different possible offsets from a nominal carrier frequency, and further wherein each element of the set is provided as a phasor having a magnitude and a phase; and
   b) responding to the set of phasors, selecting the phasor having a magnitude distinguishing it from all the other elements of the set, and determining the phase of the selected phasor;
   wherein providing the set of correlation results includes performing a coherent integration of the successive approximately carrier-demodulated received signal fragments, and performing a non-coherent integration in which phasor results of the coherent integrations are combined without regard to phase; and
   further wherein performing the non-coherent integration involves multiplying each element of a matrix of correlation results provided using a coherent integration of a first signal fragment, by the complex conjugate of a corresponding element for an immediately preceding signal fragment.

2. A method on claim 1, wherein the set of correlation results is a matrix of correlation results, and further wherein the matrix of correlation results is spanned by an index indicating an offset from a nominal carrier frequency and also by an index indicating a replica code phase, and still further wherein the selected phasor is the phasor having the maximum magnitude of all the elements of the set.

3. A method as in claim 2, wherein in providing the matrix of correlation results as phasor values and in determining the phase of the phasor having the maximum magnitude of all the elements of the matrix, only at most two phasor values are held in a memory device at any instant of time, and of the two phasor values, only the phasor value having the larger magnitude is saved in the memory device before calculating a next phasor value.

4. An apparatus for determining information about a carrier frequency of a signal transmitted by a possibly moving transmitter, the signal having a code component and a carrier component at the carrier frequency, the apparatus comprising:
   a) means, responsive to successive approximately carrier-demodulated received signal fragments of the signal, for providing a set of correlation results indicating information about a correlation of the successive approximately carrier-demodulated received signal fragments with phase-shifted replicas of the code component, wherein the successive approximately carrier-demodulated received signal fragments are formed using different possible offsets from a nominal carrier frequency, and further wherein each element of the set is provided as a phasor having a phase and a magnitude; and
   b) means, responsive to the set of phasors, for selecting the phasor having a magnitude distinguishing it from all the other elements of the set, and determining the phase of the selected phasor, and for providing information about the carrier frequency based on the phase of the selected phasor;

wherein the means for providing the set of correlation results includes means for performing a coherent integration of the successive responsive to the carrier-demodulated received signal fragments, and also means, responsive to the coherent integrations, for providing a non-coherent integration in which phasor results of the coherent integrations are combined without regard to phase; and further wherein the means for performing the non-coherent integration multiplies each element of a matrix of correlation results provided using a coherent integration of a first received signal fragment, by the complex conjugate of a corresponding element for an immediately preceding received signal fragment.

5. An apparatus as in claim 4, wherein the set of correlation results is a matrix of correlation results, and further wherein the matrix of correlation results is spanned by an index indicating an offset from a nominal carrier frequency and also by an index indicating a replica code phase, and still further wherein the selected phasor is the phasor having the maximum magnitude of all the elements of the set.

6. An apparatus as in claim 5, wherein in providing the matrix of correlation results as phasor values and in determining the phase of the phasor having the maximum magnitude of all the elements of the matrix, only at most two phasor values are held in a memory device at any instant of time, and of the two phasor values, only the phasor value having the larger magnitude is saved in the memory device before calculating a next phasor value.

7. A system, including: a transmitter for transmitting a signal having a code component and a carrier component, and a ranging receiver for receiving the signal and for determining information about the carrier frequency of the signal, the ranging receiver characterized in that it comprises:
   a) means, responsive to successive approximately carrier-demodulated received signal fragments of the signal, for providing a set of correlation results indicating information about a correlation of the successive approximately carrier-demodulated received signal fragments with phase shifted replicas of the code component, wherein the successive approximately carrier-demodulated received signal fragments are formed using different possible offsets from a nominal carrier frequency, and further wherein each element of the set is provided as a phasor having a phase and a magnitude; and
   b) means, responsive to the matrix of phasors, for selecting the phasor having a magnitude distinguishing it from all the other elements of the set, and determining the phase of the selected phasor, and for providing information about the carrier frequency based on the phase of the selected phasor;

wherein the means for providing the set of correlation results includes means, for performing a coherent integration of the successive approximately carrier-demodulated received signal fragments, and also means, responsive to the coherent integrations, for providing a non-coherent integration in which phasor results of the coherent integrations are combined without regard to phase; and further wherein the means for performing the non-coherent integration multiplies each element of a matrix of correlation results provided using a coherent integration of a first received signal fragment, by the complex conjugate of a corresponding element for an immediately preceding received signal fragment.

8. The system as in claim 7, further comprising a computing resource external to the ranging receiver, and wherein an apparatus communicates information to the computing resource via a wireless communication system and the computing resource provides at least some of the computation needed either to provide the set of correlation results or to determine the selected phasor.

9. An apparatus for determining information about a carrier frequency of a signal transmitted by a possibly moving transmitter, the signal having a code component and a carrier component at the carrier frequency, the apparatus comprising:
   a) a first module responsive to successive approximately carrier-demodulated received signal fragments of the signal, for providing a set of correlation results indicating information about a correlation of the successive approximately carrier-demodulated received signal fragments with phase-shifted replicas of the code component, wherein the successive approximately carrier-demodulated received signal fragments are formed using different possible offsets from a nominal carrier frequency, and further wherein each element of the set is provided as a phasor having a phase and a magnitude; and
   b) a second module responsive to the set of phasors, for selecting the phasor having a magnitude distinguishing it from all the other elements of the set, and determining the phase of the selected phasor, and for providing information about the carrier frequency based on the phase of the selected phasor;

wherein the first module includes a first submodule for performing a coherent integration of the successive approximately carrier-demodulated received signal fragments, and also a second submodule, responsive to the coherent integrations, for providing a non-coherent integration in which phasor results of the coherent integrations are combined without regard to phase; and further wherein the second sub-module for performing the non-coherent integration multiplies each element of a matrix of correlation results provided using a coherent integration of a first received signal fragment, by the complex conjugate of a corresponding element for an immediately preceding received signal fragment.

10. An apparatus as in claim 9, wherein the set-of correlation results is a matrix of correlation results, and further wherein the matrix of correlation results is spanned by an index indicating an offset from a nominal carrier frequency and also by an index indicating a replica code phase, and still further wherein the selected phasor is the phasor having the maximum magnitude of all the elements of the set.

* * * * *

UNITED STATES PATENT AND TRADEMARK OFFICE
CERTIFICATE OF CORRECTION

| | | |
|---|---|---|
| PATENT NO. | : 7,120,191 B2 | Page 1 of 1 |
| APPLICATION NO. | : 10/016499 | |
| DATED | : October 10, 2006 | |
| INVENTOR(S) | : Akopian | |

It is certified that error appears in the above-identified patent and that said Letters Patent is hereby corrected as shown below:

In column 14, line 34, claim 2, line 1 "on" should be -- as in --

Signed and Sealed this

Seventeenth Day of June, 2008

JON W. DUDAS
*Director of the United States Patent and Trademark Office*